US007755243B2

(12) United States Patent
Mizutani et al.

(10) Patent No.: US 7,755,243 B2
(45) Date of Patent: Jul. 13, 2010

(54) ROTATING ELECTRIC MACHINE

(75) Inventors: Ryoji Mizutani, Aichi-ken (JP);
Kazutaka Tatematsu, Nagoya (JP); Eiji Yamada, Owariasahi (JP); Nobuyuki Matsui, Nagoya (JP); Takashi Kosaka, Nagoya (JP)

(73) Assignees: Toyota Jidosha Kabushiki Kaisha, Aichi-ken (JP); Nagoya Institute of Technology, Aichi-ken (JP)

( * ) Notice: Subject to any disclaimer, the term of this patent is extended or adjusted under 35 U.S.C. 154(b) by 511 days.

(21) Appl. No.: 11/707,028

(22) Filed: Feb. 16, 2007

(65) Prior Publication Data

US 2008/0036331 A1 Feb. 14, 2008

(30) Foreign Application Priority Data

Aug. 8, 2006 (JP) ............... 2006-215885

(51) Int. Cl.
*H02K 1/27* (2006.01)
(52) U.S. Cl. ............... 310/216.007; 310/156.53; 310/216.016; 310/216.066; 310/261.1
(58) Field of Classification Search ............ 310/44, 310/156.08, 156.12–156.15, 156.28–156.31, 310/156.48–156.54, 216, 254, 216.004, 216.007, 310/216.016, 216.066
See application file for complete search history.

(56) References Cited

U.S. PATENT DOCUMENTS

| 4,947,065 | A  | * | 8/1990 | Ward et al. ............... 310/44 |
| 4,998,032 | A  | * | 3/1991 | Burgbacher ............... 310/51 |
| 6,541,887 | B2 | * | 4/2003 | Kawamura ................ 310/190 |
| 6,563,245 | B1 | * | 5/2003 | Suzuki et al. .............. 310/91 |
| 2006/0191601 | A1 | * | 8/2006 | Komuro et al. .......... 148/302 |

FOREIGN PATENT DOCUMENTS

| CN | 2128798 Y | 3/1993 |
| DE | 41 15 887 A1 | 12/1991 |
| EP | 1 037 365 A1 | 9/2000 |
| JP | 6-351206 A | 12/1994 |
| JP | 07231589 A | 8/1995 |
| JP | 7-288960 A | 10/1995 |
| JP | 2002-78306 A | 3/2002 |
| JP | 2005-65385 A | 3/2005 |
| WO | 97/01882 A1 | 1/1997 |

OTHER PUBLICATIONS

Yoshiaki Kano et al.: "Some Considerations on Simple Non-Linear Magnetic Analysis-Based Optimum Design of Multi-pole Permanent Magnet Machines", *IEEEJ Trans. IA*, vol. 123, No. 3, pp. 196-203 (2003), English Comments.
Jin Zheguo et al.: "Some Investigations into Performance of Hybrid Motor with Novel Construction", *Proceedings of National Conference of the IEE of Japan 2005*, English Comments.
Masayoshi Yamamoto, Thesis entitled: "Investigation on Performance of Field Winding Synchronous Electric Motor Utilizing SMC Core" (disclosed on Feb. 17, 2006 in presentation of 2005 energy design-related thesis at Nagoya Institute of Technology), English Comments.

* cited by examiner

*Primary Examiner*—Tran N Nguyen
(74) *Attorney, Agent, or Firm*—Sughrue Mion, PLLC

(57) ABSTRACT

A rotating electric motor includes a rotary shaft capable of rotation, a stator core formed in a cylindrical configuration, a rotor core fixed to the rotary shaft, a magnet set at the rotor core such that a pair of magnetic poles of different magnetism are aligned in the radial direction of the rotor core, a field yoke provided at the perimeter of the stator core, and a winding that can control the magnetic flux density across the rotor core and the stator core by forming a magnetic circuit across the field yoke and the rotor core.

17 Claims, 15 Drawing Sheets

ROTATING ELECTRIC MACHINE

This non-provisional application is based on Japanese Patent Application No. 2006-215885 filed with the Japan Patent Office on Aug. 8, 2006, the entire contents of which are hereby incorporated by reference.

BACKGROUND OF THE INVENTION

1. Field of the Invention

The present invention relates to rotating electric motors.

2. Description of the Background Art

Conventionally, a permanent magnet type motor having a permanent magnet disposed at the rotor is employed in various fields, and used as a driving source for electric vehicles and hybrid vehicles.

For the driving source of such electric vehicles and hybrid vehicles, the vehicle running performance of low revolution-high power and high revolution-low power is required.

The torque produced by the motor generally depends upon the magnetic flux flowing to the stator from the rotor and the armature current flowing to the stator winding.

The magnetic flux flowing across the stator and rotor is determined by the employed magnet and the like. The magnetic flux is maintained constant independent of the rotational speed. The rotational speed is determined by the armature current. However, since the armature current is determined depending upon the voltage from the power source such as an inverter, the speed of revolution becomes highest when the voltage of the armature winding matches the maximum voltage of the power supply voltage.

When constant power driving is to be conducted based on a constant power supply voltage in such a permanent magnet type motor, there is known the so-called "field weakening" and "field strengthening" for the purpose of further increasing the highest speed of revolution to improve the running performance as well as to increase the power at a low revolution speed, as disclosed in Japanese Patent Laying-Open Nos. 6-351206, 2002-78306, 2005-65385, and 7-288960; "Some Considerations on Simple Non-Linear Magnetic Analysis-Based Optimum Design of Multi-pole Permanent Magnet Machines" by Yoshiaki Kano, Takashi Kosaka, and Nobuyuki Matsui in IEEJ Trans. IA, Vol. 123, No. 3, pp. 196-203 (2003); and "Some Investigations into Performance of Hybrid Motor with Novel Construction" by Jin Zheguo, Takashi Kosaka, Nobuyuki Matsui in the Proceedings of National Conference of the IEE of Japan 2005.

For example, the motor disclosed in "Some Considerations on Simple Non-Linear Magnetic Analysis-Based Optimum Design of Multi-pole Permanent Magnet Machines" by Yoshiaki Kano, Takashi Kosaka, and Nobuyuki Matsui in IEEJ Trans. IA, Vol. 123, No. 3, pp. 196-203 (2003) includes a rotor divided into two in the axial direction, a ring magnet arranged between the divided rotors, a field pole formed of a powder-molded magnetic composite arranged at the outer circumferential side of the stator core, and a toroidal field coil.

The divided rotors include a plurality of salient poles formed along the circumferential face spaced apart from each other. The salient poles are arranged such that the salient pole of one rotor is displaced with the salient pole of the other rotor in the circumferential direction.

The N magnetic pole of the ring magnet is arranged towards the end face of one divided rotor whereas the S magnetic pole is arranged towards the end face of the other rotor. The magnetic line of force from the ring magnet first enters the rotor from the end face thereof and runs through the air gap from the salient pole of one rotor towards the stator. Then, the magnetic line of force from the stator passes through the field pole to run from the stator teeth to the salient pole of the other divided rotor via the air gap to return to the S magnetic pole of the ring magnet.

Then, using a toroidal field coil, the magnetic flux of the permanent magnet is drawn towards the field pole, reducing the magnetic flux passing through the armature winding. Thus, field weakening is realized. Furthermore, the magnetic flux of the permanent magnet is confined in the main motor, so that the magnetic flux generated by the toroidal field coil increases the magnetic flux passing through the armature winding to realize field strengthening.

In the rotating electric motor set forth above, the magnetic line of force exits the salient pole of one of the divided rotor, and the magnetic line of force enters the salient pole of the other divided rotor. Therefore, each region of the rotor located between the salient poles will not contribute to torque generation. There was the disadvantage that the rotor must be increased to obtain the desired torque.

There is also the disadvantage that the magnetic line of force, when entering the salient pole of the rotor, is affected by the magnetic flux of the armature winding. As a result, the magnetic line of force from the stator will not enter the desired salient pole. There was a problem that negative torque is generated, depending upon the direction of the magnetic line of force.

SUMMARY OF THE INVENTION

In view of the foregoing, an object of the present invention is to provide a rotating electric motor that can have the flux linkage quantum of an armature winding adjusted, allowing the rotor to be formed compact, and directed to reducing the effect of the magnetic flux of the armature winding on the magnetic line of force entering the rotor from the stator.

A rotating electric motor according to an aspect of the present invention includes a rotary shaft capable of rotation, a stator core formed in a cylindrical configuration, a rotor core fixed to the rotary shaft, a magnet set at the rotor core such that a pair of magnetic poles differing in polarity are aligned in a radial direction of the rotor core, a field yoke provided at a perimeter of the stator core, and a winding that can control the magnetic flux density across the rotor core and the stator core by forming a magnetic circuit across the field yoke and the rotor core. Preferably, the rotor core includes a first rotor core of a cylindrical configuration, and a second rotor core provided in the inner circumference of the first rotor core, having a magnetic reluctance in the axial direction lower than the magnetic reluctance of the first rotor core in the axial direction.

Preferably, the magnetic reluctance of the first rotor core in the circumferential direction and radial direction is smaller than the magnetic reluctance in the axial direction. The magnetic reluctance of the stator core is smaller in the circumferential direction and radial direction than in the axial direction. Preferably, the rotating electric motor further includes a salient pole formed at the outer surface of the rotor core, protruding outwardly in the radial direction. The magnet is provided at the outer surface of the rotor core adjacent to the salient pole. Preferably, the magnet includes a first magnet and a second magnetic pole located adjacent to the first magnet. The magnetic pole of the first magnet of the region located at the outer surface side of the rotor core is set different from the magnetic pole of the second magnet of the region located at the outer surface side of the rotor core.

Preferably, the magnet extends from one end to the other end of the rotor core. Preferably, the first magnet is formed longer than the second magnet in the axial direction. The rotating electric motor further includes a salient pole formed between the first magnet and at the surface of the rotor core located adjacent to the second magnet in the axial direction of the rotor core, protruding outwardly in the radial direction of the rotor core. Preferably, the magnet is embedded in the rotor core. Preferably, the field yoke is formed of a magnetic material integrally compacted. The first rotor core is formed of a plurality of layered steel plates. The second rotor core is formed of a magnetic material integrally compacted.

According to another aspect of the present invention, a rotating electric motor includes a rotary shaft capable of rotation, a stator core formed in a cylindrical configuration, a rotor core fixed to the rotary shaft, a salient pole formed at an outer surface of the rotor core, protruding outwardly in a radial direction, and extending from one end to an other end of the rotor core, a field yoke provided at the perimeter of the stator core, and a winding that can control the magnetic flux density across the rotor core and the stator core by forming a magnetic circuit across the field yoke and the rotor core.

Preferably, the rotor core includes a first rotor core of a cylindrical configuration, and a second rotor core provided in the inner circumference of the first rotor core, and having a magnetic reluctance smaller in an axial direction than the magnetic reluctance of the first rotor core in the axial direction. Preferably, the field yoke is formed of a magnetic material integrally compacted. Preferably, the first rotor core is formed of a plurality of layered steel plates. The second motor core is formed of a magnetic material integrally compacted.

In accordance with the rotating electric motor of the present invention, the rotor can be formed in a compact manner, and the effect of the magnetic flux of the armature winding on the magnetic line of force entering the rotor from the stator can be reduced in a rotating electric motor that can adjust the flux linkage quantum of the armature winding.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
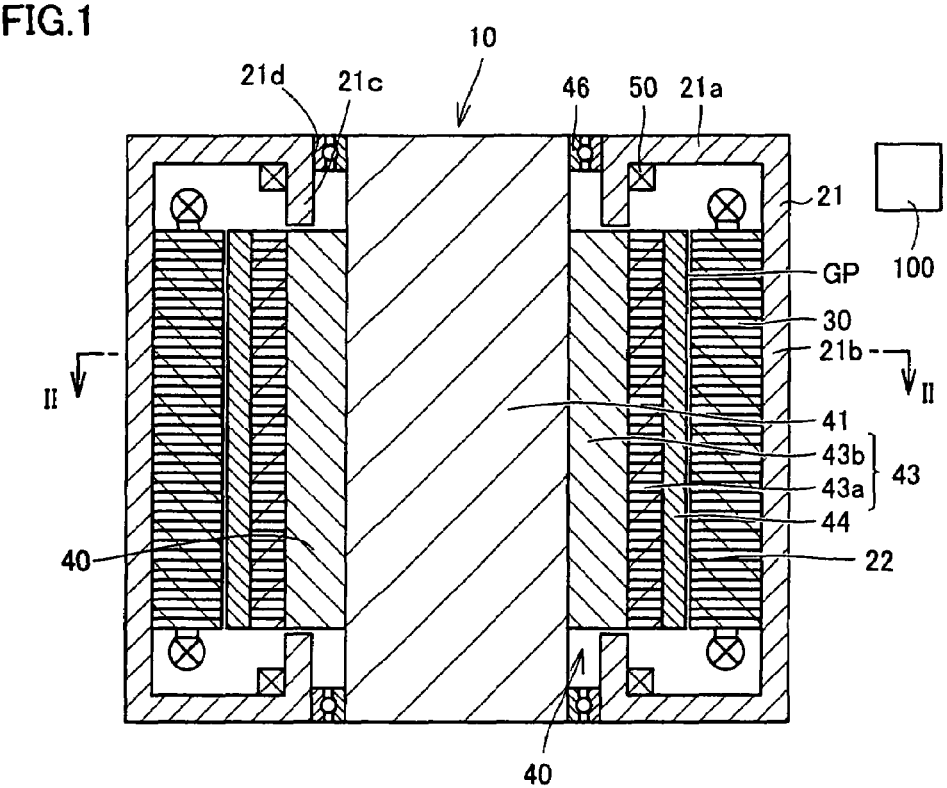
FIG. 1 is a side sectional view of a rotating electric motor according to a first embodiment.

Embodiments of the present invention will be described hereinafter with reference to FIGS. 1-24.

The embodiments set forth below will be described with reference to the drawings, based on an application of the present invention to a motor generator (rotating electric machine) incorporated in a hybrid vehicle. However, the present invention is applicable to a rotating electric machine incorporated in various types of vehicles other than a hybrid vehicle (for example, electric-driven vehicles including a fuel cell vehicle and electric vehicle) as well as to various equipment such as industrial equipment, air conditioning equipment, and environmental equipment.

In the embodiments, the same or corresponding elements have the same reference characters allotted. All of the constituent elements of respective embodiments are not mandatory, and there are cases where some of the constituent elements can be omitted.

First Embodiment

Figure 2:
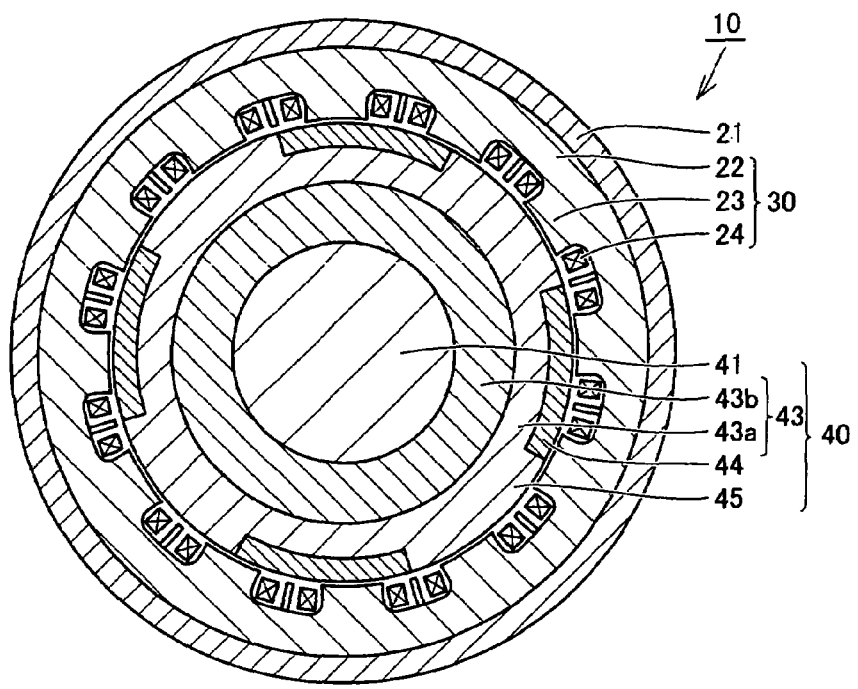
FIG. 2 is a sectional view taken along line II-II of FIG. 1.

FIG. 1 is a side sectional view of a rotating electric motor 10 according to a first embodiment, and FIG. 2 is a sectional view taken along line II-II of FIG. 1. Referring to FIGS. 1 and 2, rotating electric motor 10 includes a rotary shaft 41, a rotor 40 fixed to rotary shaft 41, a field yoke 21 provided at the perimeter of stator 30, and a field coil 50.

An air gap GP is located between rotor 40 and stator 30, such that rotor 40 and stator 30 are spaced apart slightly in the radial direction.

Rotor 40 includes a rotor core 43 fixed to rotary shaft 41, and a magnet 44 provided at the outer surface of rotor core 43.

Rotor core 43 includes a layered rotor core 43*a* formed in a cylindrical configuration, and a compacted rotor core 43*b* provided in the inner circumference of layered rotor core 43*a*.

Compacted rotor core 43*b* is formed integrally of a magnetic material, specifically a powder-molded magnetic composite (SMC: Soft Magnetic Composites).

Layered rotor core 43*a* is formed having a plurality of electromagnetic steel plates stacked. Since there is a gap between the steel plates, the magnetic reluctance in the axial direction is larger than the magnetic reluctance in the axial direction and circumferential direction. Therefore, the magnetic line of force from the magnet will flow with difficulty in the axial direction and flow readily in the radial direction and circumferential direction in layered rotor core 43a.

Since compacted rotor core 43b is formed of a powder-molded magnetic material, the magnetic reluctance of compacted rotor core 43b in the axial direction is set smaller than the magnetic reluctance of layered rotor core 43a in the axial direction. Therefore, in compacted rotor core 43b, the magnetic line of force flows in the axial direction more readily than in layered rotor core 43a.

As shown in FIG. 2, a plurality of rotor teeth (first salient pole) 45 are provided equally spaced from each other at the outer surface of layered rotor core 43a, and protruding outwardly in the radial direction.

A magnet 44 is provided between rotor teeth 45. The outer surface of rotor teeth 45 and the outer surface of magnet 44 are both located on the same virtual circumference centered about the center axis line of rotary shaft 41.

In other words, magnet 44 is arranged adjacent to rotor teeth 45 in the circumferential direction of rotor 40, each having a coplanar circumferential face.

The N pole (first magnetic pole) and the S pole (second magnetic pole) of magnet 44 are arranged to align in the radial direction of rotor 40. In the first embodiment, the N pole of magnet 44 is arranged facing the outer side in the radial direction of rotor core 43 whereas the S pole is arranged facing the inner side in the radial direction of rotor core 43. However, they may be arranged in an opposite manner.

Stator 30 includes a stator core 22 formed in a hollow cylindrical configuration, a plurality of stator teeth (second salient pole) 23 formed at the inner surface of stator core 22, protruding inwardly in the radial direction of stator core 22, and a coil 24 wound around stator teeth 23. Stator teeth 23 are formed equally spaced apart in the circumferential direction.

One portion of coil 24 constitutes a U-phase coil, and another remaining portion of coil 24 constitutes a V-phase coil. The remaining portion of coil 24 constitutes a W-phase coil.

One end of coil 24 is taken as a terminal, and the other end is taken as a neutral point. Any of a U-phase cable, V-phase cable, and W-phase cable of a three-phase cable of an inverter not shown is connected to the terminal. The neutral point is connected in common at one point.

A control device 100 shown in FIG. 1 receives, from an ECU (Electrical Control Unit) provided externally of rotating electric motor 10, a torque command value to be output by rotating electric motor 10 to generate a motor control current to output the torque specified by the received torque command value. The generated motor control current is supplied to coil 24 via the three-phase cable.

Stator core 22 is formed having a plurality of magnetic steel plates stacked with an air gap therebetween.

Therefore, the magnetic reluctance of stator core 22 in the radial direction and circumferential direction is smaller than the magnetic reluctance in the axial direction. Accordingly, the magnetic line of force entering stator core 22 flows readily in the circumferential direction and radial direction of stator core 22, and is restricted from flowing in the axial direction.

As shown in FIG. 1, field yoke 21 includes a top 21a arranged at a position spaced apart in the axial direction from both ends of stator 30 and rotor 40, a sidewall 21b of a cylindrical configuration formed at the perimeter of top 21a, and a cylindrical projection 21c formed at top 21a.

A through hole 21d is formed at the central region of top 21a. Rotary shaft 41 is inserted into through hole 21d via a bearing 46. Sidewall 41b is fixed to the outer surface of stator core 22.

Field yoke 21 is formed integrally of a magnetic material, specifically a powder molded magnetic composite (SMC) that is a three dimensional complete isotropic material. Therefore, the magnetic reluctance of field yoke 21 in the axial direction is smaller than that of stator core 22 in the axial direction.

Projection 21c is formed at the inner surface of top 21a, protruding towards the end of compacted rotor core 43b in the axial direction. The end of projection 21c is located in proximity to the end of compacted rotor core 43b such that the magnetic line of force is not disconnected between the ends of projection 21c and compacted rotor core 43b.

Accordingly, a magnetic circuit (first magnetic circuit) is formed, corresponding to the path from the surface of magnet 44 to arrive at field yoke 41 via air gap GP and stator core 22, flowing through field yoke 21 in the axial direction to enter compacted rotor core 43b from projection 21c to return to the S pole of magnet 44.

In this magnetic circuit, the magnetic reluctance of stator core 22 in the radial direction is suppressed at a low level, likewise the magnetic reluctance in field yoke 21, and the magnetic reluctance of compacted rotor core 43b. Therefore, the loss in magnetic energy can be suppressed at a low level.

Although cylindrical projection 21c is formed at field yoke 21 in the embodiment shown in FIG. 1, projection 21c may be provided at the end of compacted rotor core 43b.

Field coil (winding) 50 is wound around the outer circumference of projection 21c. By conducting current through field coil 50, the magnetism of the N pole and the S pole can be set up at the end side of projection 21c and at sidewall 21b, respectively, or the magnetism of the S pole and the N pole can be set up at the end side of projection 21c and at sidewall 21b, respectively. Although field coil 50 is provided at projection 21c of field yoke 21 in the first embodiment, the location is not limited thereto, and field coil 50 may be provided at field yoke 21. Provision of field coil 50 at field yoke 21 is not limited to the case where field coil 50 abuts against the surface of field yoke 21, and includes the case where field coil 50 is located apart from the surface of field yoke 21 as long as the flow of magnetic line of force in field yoke 21 can be controlled.

Figure 3:
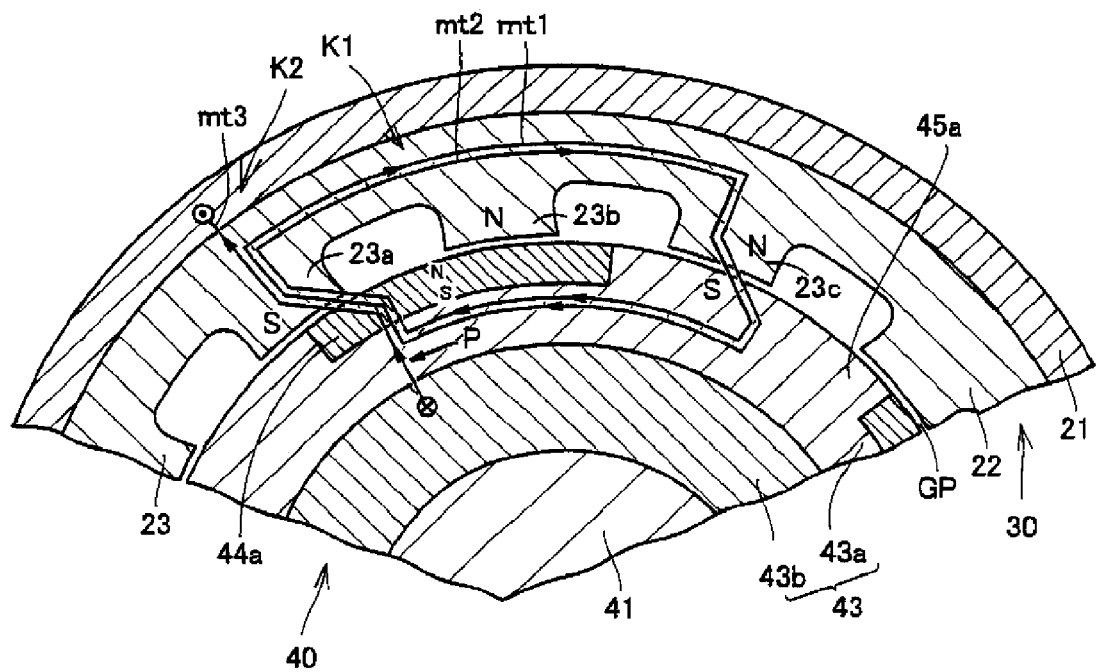
FIG. 3 is a sectional view representing the flow of magnetic lines of force from a magnet in a state where current is not supplied to the field coil.

The operation of rotating electric motor 10 configured as set forth above will be described hereinafter with reference to FIGS. 3-8. FIG. 3 is a sectional view representing the flow of magnetic lines of force from magnet 44 in a state where current is not supplied to field coil 50 of FIG. 1.

In the example of FIG. 3, stator teeth 23a is arranged at the end side of magnet 44a, corresponding to the end side of rotor 40 at the forward side in the direction of rotation P. The center portion of magnet 44 in the circumferential direction at the outer circumferential side is located at the backward side in the direction of rotation P than the center portion of stator teeth 23a in the circumferential direction at the end face. The end face of stator teeth 23a at the inner diameter side is taken as the S pole.

Therefore, magnetic lines of force mt1-mt3 from the outer surface of magnet 44a runs in an inclining manner towards the forward side in the direction of rotation P, as a function of running outwardly in the radial direction to arrive at the end face of stator teeth 23a. Since the magnetic path of magnetic lines of force mt1-mt3 across magnet 44a and stator teeth 23a is increased by the inclination, stress is applied to rotor 40 such that the magnetic path is minimized. In other words, magnet 44a is pulled towards stator teeth 23a.

In contrast to stator teeth 23a, stator teeth 23b is provided at the backward side in the direction of rotation P of rotor 40. Stator teeth 23b is located substantially facing the central region of magnet 44a. The end face of stator teeth 23b at the inner diameter side corresponds to an N pole, repelling against magnet 44a.

Therefore, magnetic lines of force mt1 and mt2 qualified as a portion of magnetic lines of force mt1-mt3 entering stator core 22 from stator teeth 23a flow through stator core 22 along the circumferential direction. At this stage, the energy loss of the magnetic lines of force is reduced since the magnetic reluctance within stator core 22 is small.

In addition to stator teeth 23b, stator teeth 23c is provided at the backward side in the direction of rotation P of rotor 40. The end face of stator teeth 23c at the inner diameter side corresponds to the N pole, and faces rotor teeth 45a.

Since the outer surface of magnet 44a adjacent to rotor teeth 45a corresponds to the N pole, magnetic lines of force mt1 and mt2 directed towards the rotor teeth 45a from the end face of rotor teeth 23c is affected by the N pole of magnet 44a to run in an inclining manner towards the backward side in the direction of rotation P towards rotor teeth 45a. Although magnetic lines of force mt1 and mt2 may be affected by the flux generated at coil 24 shown in FIG. 1 across stator teeth 23c and rotor teeth 45a, the path of magnetic lines of force mt1 and mt2 will not be disturbed due to the regulation of magnet 44a. Thus, magnetic lines of force mt1 and mt2 from stator teeth 23c to rotor teeth 45a run in an inclining manner towards the backward side in the direction of rotation P, as a function of running inwardly in the radial direction.

Since the path of magnetic lines of force mt1 and mt2 from stator teeth 23c towards rotor teeth 45a becomes longer by the inclination of magnetic lines of force mt1 and mt2, rotor teeth 45a is favorably attracted towards stator teeth 23c.

Thus, magnetic lines of force mt1 and mt2 form magnetic circuit K1, corresponding to the path from magnet 44a to arrive at stator teeth 23a via air gap GP, flows through stator core 22 in the circumferential direction, then arrives at layered rotor core 43a from stator teeth 23c via air gap GP to return to magnet 44a.

The remaining magnetic line of force mt3 among magnetic lines of force mt1-mt3 from magnet 44a arrives at stator teeth 23a, and then flows through stator core 22 in the radial direction to arrive at field yoke 21.

In FIG. 2, magnetic line of force mt3 forms a magnetic circuit K2, corresponding to the path running through field yoke 21 in the axial direction to enter compacted rotor core 23b from projection 21c to return to magnet 44. Since the number of times magnetic circuit K2 crosses rotor 40 and stator 30 is lower than the number of times magnetic circuit K1 crosses rotor 40 and stator 30, the torque generated by magnetic line of force mt3 is smaller than the torque generated by magnetic lines of force mt1 and mt2. In other words, the magnetic lines of force corresponding to magnetic circuit K1 generates torque greater than that by the magnetic lines of force corresponding to magnetic circuit K2.

By adjusting the quantum of flux through magnetic circuit K1 and the quantum of flux through magnetic circuit K2, the flux linkage quantum of the armature winding can be adjusted to control the torque.

The surface of magnet 44 along the outer circumferential face of rotor 40 functions as a region to generate magnetic lines of force whereas rotor teeth 45 functions as a region where the generated magnetic lines of force enter. Magnet 44 and rotor teeth 45 extend from one end to the other end of rotor 40. The surface of magnet 44 and the surface of rotor teeth 45 constitute the outer circumferential face of rotor 40. Therefore, substantially the entire area of the outer circumferential face of rotor teeth 45 can function as a region from which magnetic lines of force are output or into which magnetic lines of force are input, allowing improvement of the usage efficiency of the outer circumferential face of rotor 40.

By improving the usage efficiency of the outer circumferential face of rotor 40, the desired flux quantum can be input/output even if a small rotor 40 is employed. Therefore, rotor 40 per se can be formed compact. According to rotor 40 set forth above, magnetic circuit K2 having high efficiency of torque generation can be formed across both ends of rotor 40 in the axial direction. Therefore, torque of a great amount can be obtained.

Since the magnetic line of force emitted from magnet 44 enters rotor teeth 45a formed at an outer circumferential face of rotor 40 adjacent to magnet 44 such that the length of the path of magnetic circuit K1 that greatly contributes to torque generation is set short, the magnetic energy loss can be reduced to a low level.

Since magnetic circuit K1 passes through stator core 22 and layered rotor core 23a having diffusion of the magnetic lines of force in the axial direction suppressed, magnetic energy loss can be further reduced.

Figure 4:
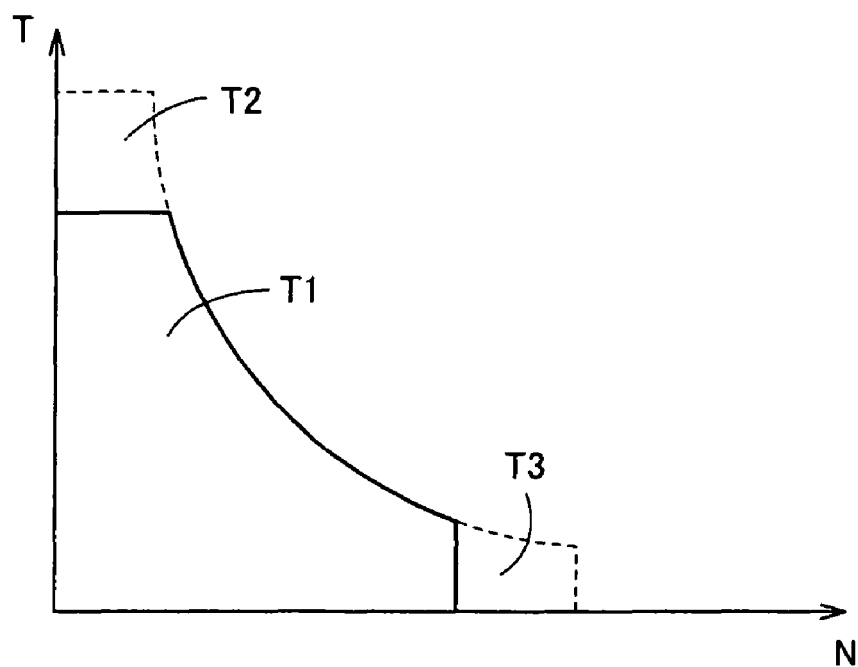
FIG. 4 is a graph representing the relationship between the torque (T) and revolution speed (N) of a rotating electric motor.

FIG. 4 is a graph representing the relationship between torque (T) and revolution speed (N) of rotating electric motor 10. In FIG. 4, T1 represents the characteristics of rotating electric motor 10 in a state where the drive of field coil 50 shown in FIG. 1 is ceased. T2 represents the characteristics of low revolution-high power with respect to T1, corresponding to the characteristics of rotating electric motor 10 when subjected to "field strengthening control".

Figure 5:
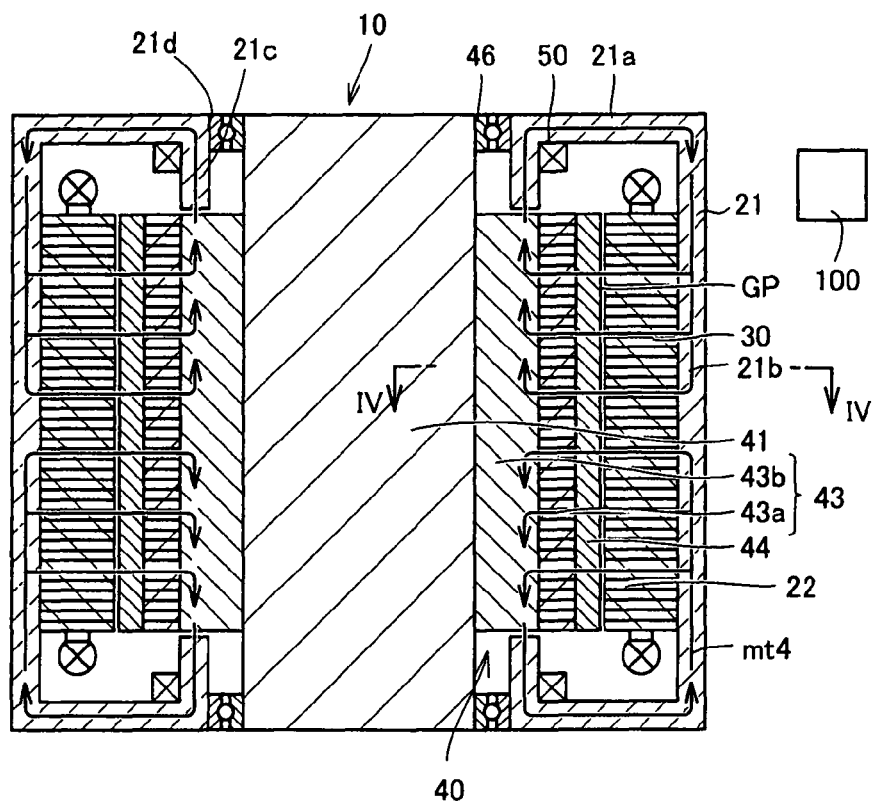
FIG. 5 is a side sectional view of a rotating electric motor when "field strengthening control" is effected.
Figure 6:
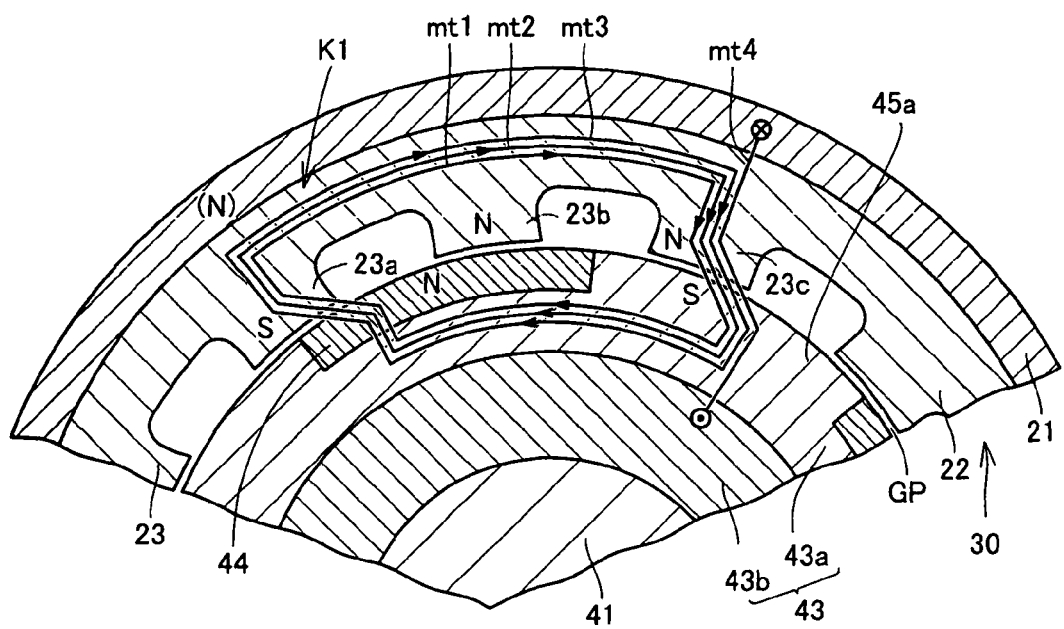
FIG. 6 is a sectional view taken along line IV-IV of FIG. 5.

FIG. 5 is a side sectional view of rotating electric motor 10 when field strengthening control is effected. FIG. 6 is a sectional view taken along line IV-IV of FIG. 5.

Referring to FIG. 5, magnetic line of force mt4 generated by field coil 50 passes through top 21a of field yoke 21 to enter stator core 22 from sidewall 21b. Magnetic line of force mt4 then enters rotor core 43 via air gap GP to run in rotor core 43 in the axial direction. Then, magnetic line of force mt4 enters field yoke 21 via the end face of projection 21c from the end face of rotor core 43 in the axial direction.

By generating such a magnetic circuit, projection 21c of field yoke 21 takes on the magnetism of the S pole whereas sidewall 21b of field yoke 21 takes on the magnetism of the N pole.

Referring to FIG. 6, magnetic lines of force mt1-mt3 from magnet 44 enter stator core 22 from the end face of stator teeth 23a to run along the circumferential direction of stator core 22 due to the inner wall of sidewall 21b corresponding to the N pole. Magnetic lines of force mt1-mt3 enter layered rotor core 43a from the end face of stator teeth 23c via rotor teeth 45a.

Thus, control is effected such that magnetic lines of force mt1-mt3 issued from magnet 44 are suppressed from passing through magnetic circuit K2, and passes through magnetic circuit K1. Therefore, torque of a greater amount can be generated. In other words, since the quantum of flux generated from magnet 44 is constant, increasing the ratio of the quantum of flux passing through magnetic circuit K1 that greatly contributes to torque generation allows torque of a greater amount to be obtained.

Magnetic line of force mt4 generated by field coil 50 of FIG. 5 is a portion of magnetic circuit K1, as shown in FIG. 6. Magnetic line of force mt4 passes through the path from stator teeth 23a to rotor teeth 45a, and then arrives at compacted rotor core 43b. Therefore, magnetic line of force mt4 also contributes to torque generation.

By effecting "field strengthening control" set forth above, rotating electric motor 10 allows production of high torque at a low revolution, as shown by T2 in FIG. 4.

Figure 7:
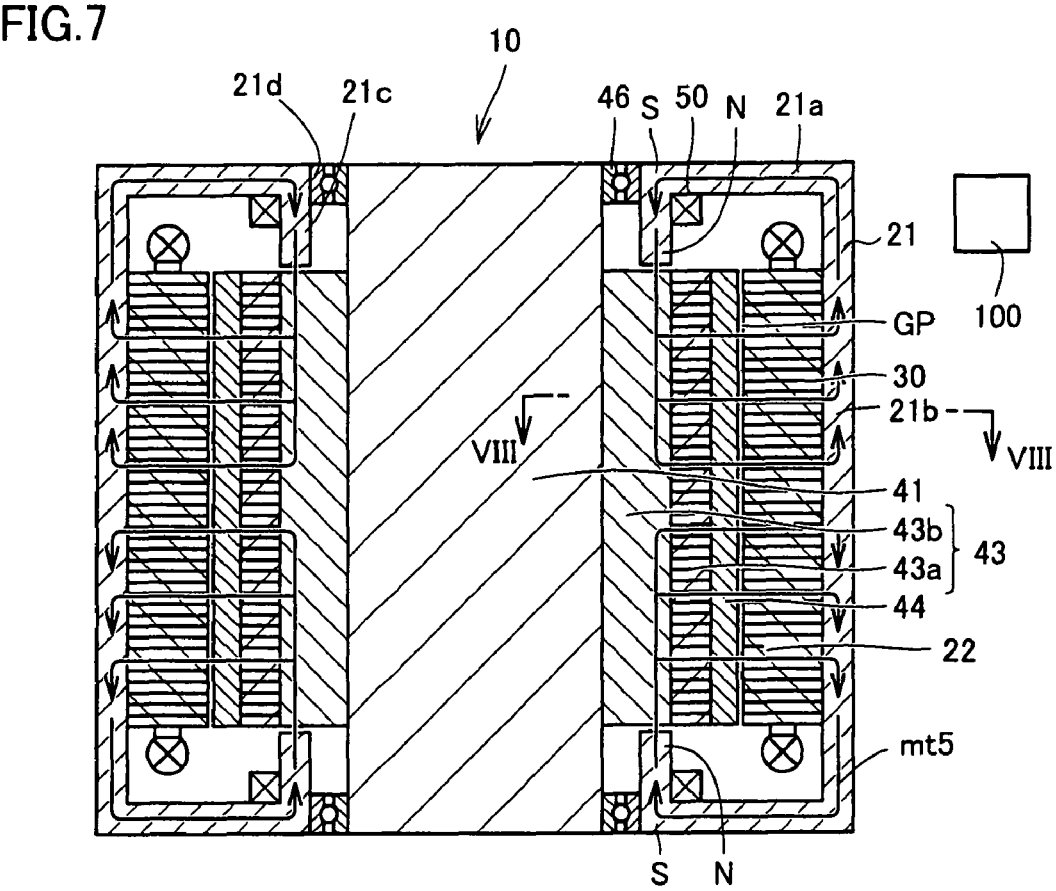
FIG. 7 is a side sectional view of a rotating electric motor when field weakening control is effected.
Figure 8:
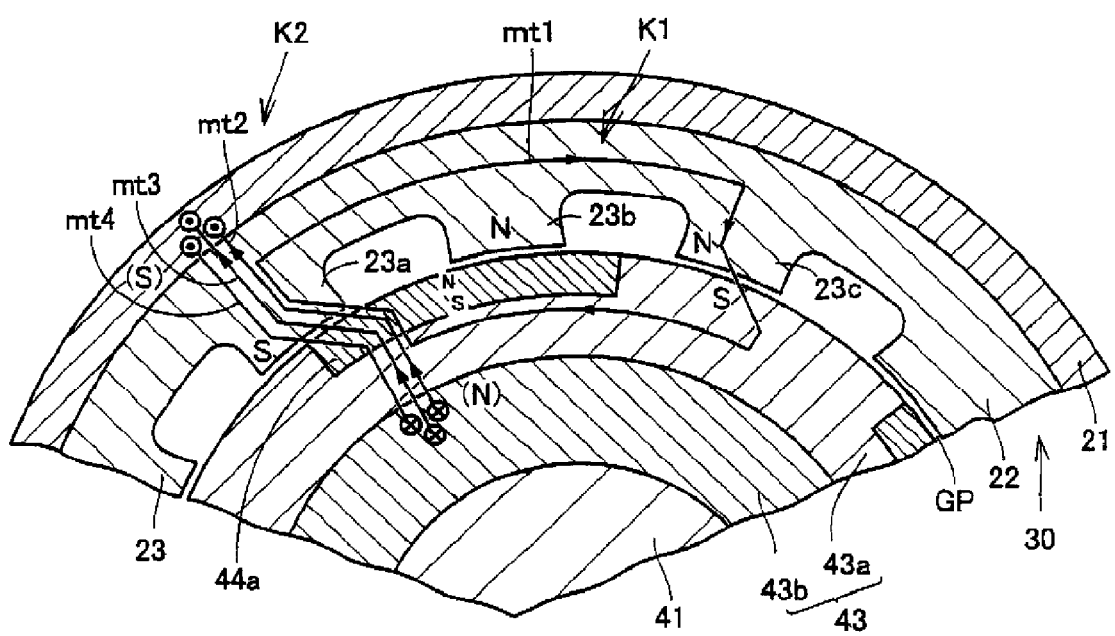
FIG. 8 is a sectional view taken along line VIII-VIII of FIG. 7.

FIG. 7 is a side sectional view of rotating electric motor 10 when field weakening control is effected. FIG. 8 is a sectional view taken along line VIII-VIII of FIG. 7. As shown in FIG. 7, current is conducted to field coil 50 to generate a magnetic line of force mt5 that passes through projection 21c of field yoke 21, arrives at compacted rotor core 43b to run therethrough in the axial direction, crossing layered rotor core 43a in the radial direction to enter stator core 22 via air gap GP from layered rotor core 43a, and then entering sidewall 21b of field yoke 21 to return to projection 21c.

Accordingly, projection 21c of field yoke 21 takes on the magnetism of the N pole whereas sidewall 21b of field yoke 21 takes on the magnetism of the S pole.

Magnetic lines of force mt2 and mt3 among magnetic lines of force mt1-mt3 emitted from magnet 44 are pulled towards sidewall 21b of field yoke 21. Specifically, magnetic lines of force mt2 and mt3 enter stator teeth 23a to run in the radial direction of stator core 22 and arrives at sidewall 21b of field yoke 21. Then, magnetic lines of force mt2 and mt3 run through magnetic circuit K2 to return to magnet 44.

The remaining magnetic line of force mt1 of magnetic lines of force mt1-mt3 emitted from magnet 44 enters stator core 22 and then runs through magnetic circuit K1 to return to magnet 44.

By such field weakening control, the ratio of the quantum of flux passing through magnetic circuit K2 among magnetic lines of force mt1-mt3 issued from magnet 44 is increased to reduce the quantum of flux crossing stator 30 and rotor 40.

By reducing the magnetic flux generated across stator 30 and rotor 40, the inductive electromotive force generated at coil 24 of FIG. 1 can be weakened even at the high revolution region. By this reduction of the inductive electromotive force, the revolution speed that matches the maximum voltage of the power source such as the inverter can be improved. Thus, rotating electric motor 10 can be driven as shown by T3 in FIG. 4 even at the high revolution region.

Second Embodiment

A rotating electric motor 11 according to a second embodiment will be described hereinafter with reference to FIGS. 9-15. Elements corresponding to those shown in FIGS. 1-8 have the same reference characters allotted, and description thereof will not be repeated.

Figure 9:
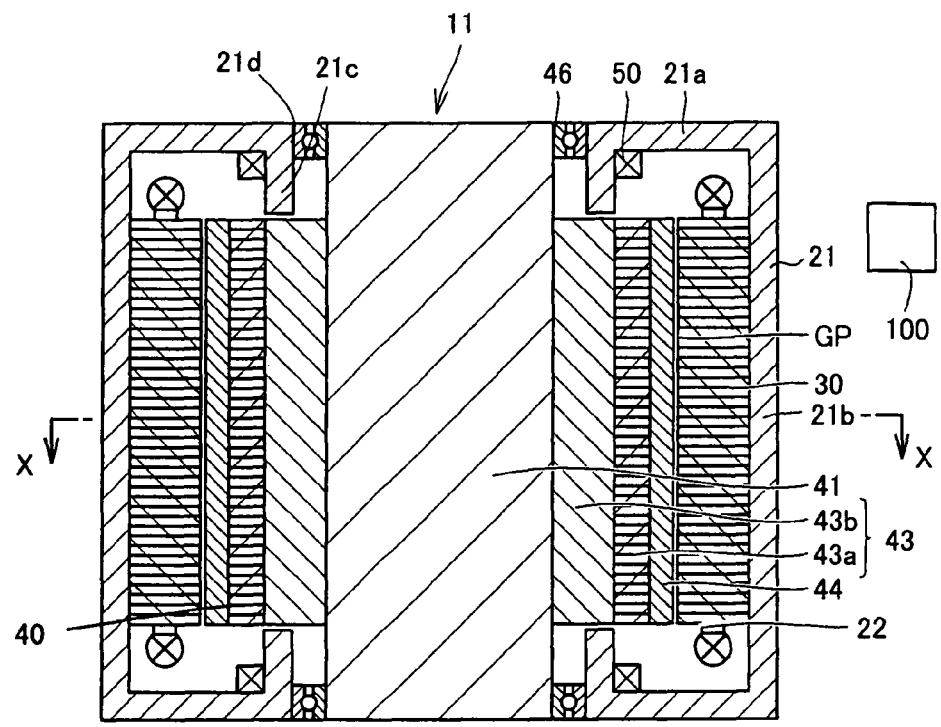
FIG. 9 is a side view of a rotating electric motor according to a second embodiment.
Figure 10:
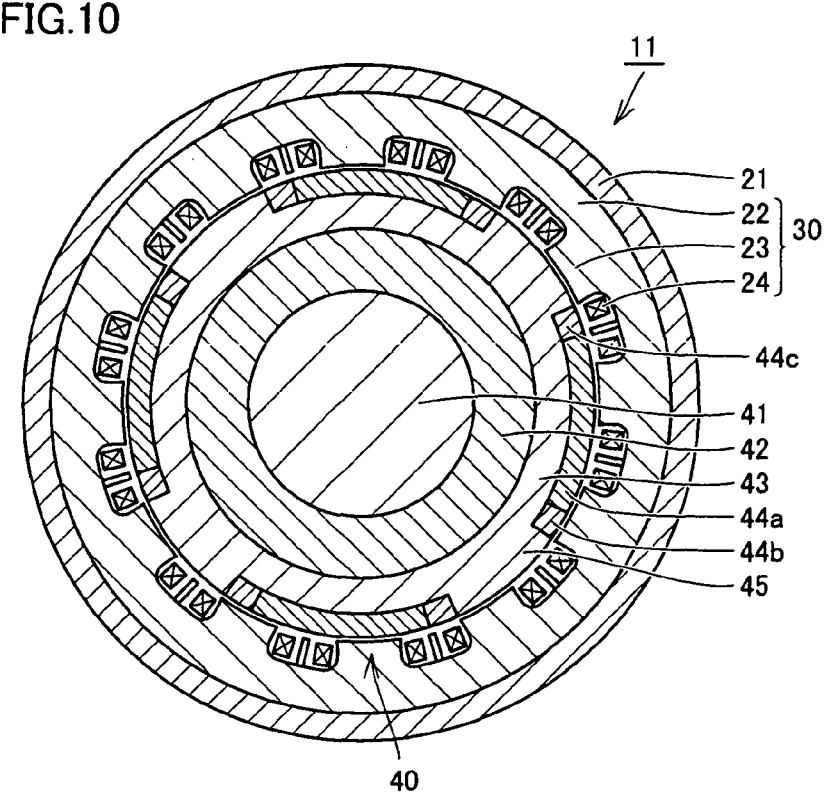
FIG. 10 is a sectional view taken along line X-X of FIG. 9.

FIG. 9 is a side view of rotating electric motor 11 according to the second embodiment. FIG. 10 is a sectional view taken along line X-X of FIG. 9.

Referring to FIG. 10, magnet 44 includes a magnet (first magnet) 44a, and magnets 44b and 44c (second magnet) provided adjacent to magnet 44a. Magnets 44b and 44c are located at either end of magnet 44a in the circumferential direction.

Magnet 44a located at the outer surface side of rotor core 43 is arranged such that the magnetic pole thereof differs from the magnetic poles of magnets 45b and 44c located at the outer surface side of rotor core 43. In the second embodiment, the magnetic pole of magnet 44a located at the outer surface side of rotor core 43 takes the N pole. The magnetic poles of magnet 44b and 44c take the S pole.

By the provision of magnets 44b and 44c, the magnetic flux of magnets 44b and 44c is added to the magnetic flux of magnet 44a. Therefore, the total quantum of flux of magnet 44 is greater than that of magnet 44a alone. Magnets 44a, 44b and 44c extend across both ends of rotor 40. Therefore, the function and advantage similar to those of rotating electric motor 10 of the first embodiment can be obtained.

Figure 11:
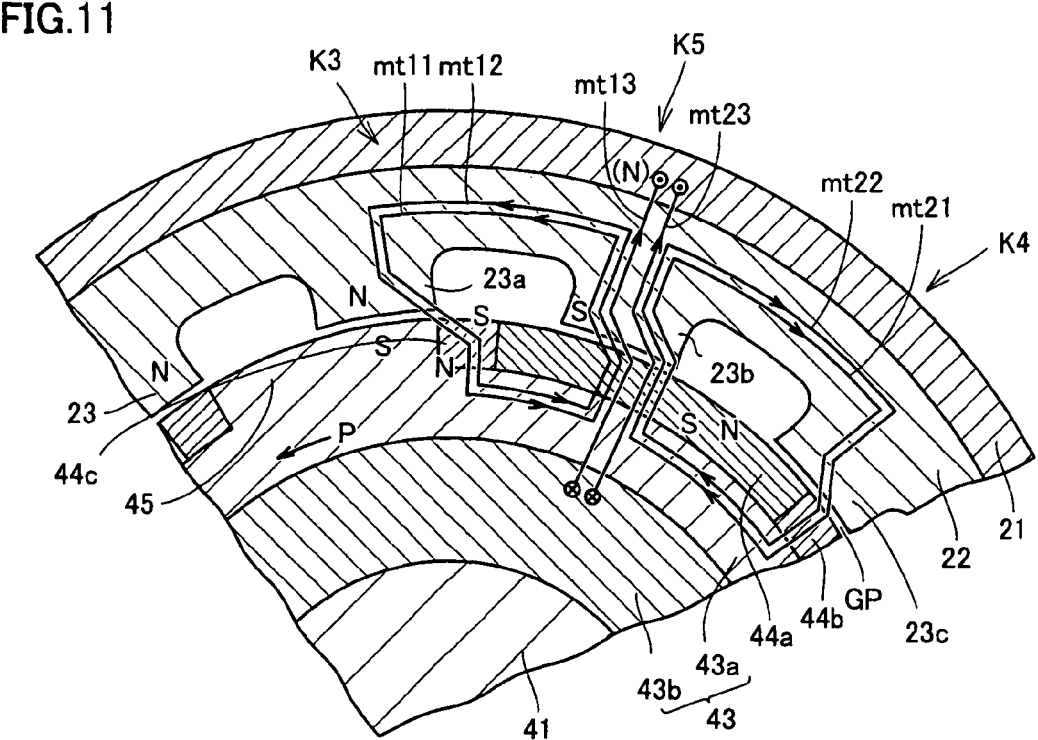
FIG. 11 is a sectional view representing the flow of magnetic lines of force in a state where current is not supplied to the field coil.

FIG. 11 is a sectional view representing the flow of the magnetic line of force when current is not supplied to field coil 50 shown in FIG. 9. In the example of FIG. 11, magnet 44c is arranged at the end located at the forward side in the direction of rotation P of magnet 44a. Magnet 44b is arranged at the end of magnet 44a at backward side in the direction of rotation P.

Stator teeth 23a is located at the forward side than magnet 44c in the direction of rotation P. The end face of stator teeth 23a takes on the magnetism of the N pole. Magnet 44a faces stator teeth 23b. The end face of stator teeth 23b takes on the magnetism of the S pole. The center portion of magnet 44a at the outer surface in the circumferential direction is located at the backward side in the direction of rotation P with respect to the center portion of stator teeth 23b in the circumferential direction.

Magnet 44b faces stator teeth 23c. The end face of stator teeth 23c takes on the magnetism of the N pole. The center portion of magnet 44b at the outer surface in the circumferential direction is located at the backward side in the direction of rotation P than the center portion of stator teeth 23c at the outer surface in the circumferential direction.

Since magnet 44a is located displaced at the backward side in the direction of rotation P with respect to stator teeth 23b, magnetic lines of force mt11-mt13 and mt21-mt23 issued from the surface of magnet 44a runs in an inclining manner towards the forward side in the direction of rotation P, as a function of running outwardly in the radial direction from the surface of magnet 44a.

Since the path length is increased by the inclination of magnetic lines of force mt11-mt13 and mt21-mt23, magnet 44a is pulled towards the forward side in the direction of rotation P such that the path length of magnetic lines of force mt11-mt13 and mt21-mt23 is reduced.

Magnetic lines of force mt21 and mt22 among magnetic lines of force mt11-mt13 and mt21-mt23 arriving at stator teeth 23b flow through stator core 22 towards the backward side in the direction of rotation P to enter magnet 44b from stator teeth 23c.

Specifically, magnetic lines of force mt21 and mt22 form a magnetic circuit K4, corresponding to the path from the surface of magnet 44a to stator teeth 23b, running through stator core 22 towards the backward side in the direction of rotation P, arriving at rotor core 23 from stator teeth 23c to return to magnet 44a.

Since the center portion of magnet 44b is located at the backward side in the direction of rotation P with respect to the center portion of stator teeth 23c, magnetic lines of force mt21 and mt22 run in an inclining manner towards the backward side in the direction of rotation P, as a function of running inwardly in the radial direction. Therefore, magnet 44c is pulled such that the center portion of stator teeth 23c and the center portion of magnet 44c is consistent in the radial direction.

Some of the magnetic lines of force, i.e. magnetic lines of force mt11 and mt12, among the magnetic lines of force mt11-mt13 and mt21-mt23 flow through stator core 22 towards the frontward side in the direction of rotation P to enter rotor core 43 from stator teeth 23a.

Specifically, magnetic lines of force mt11 and mt12 pass through a magnetic circuit K3 from the surface of magnet 44a to stator teeth 23b, running through stator core 22 towards the forward side in the direction of rotation P, and enter rotor core 43 from the end face of stator teeth 23a to return to magnet 44a.

Since magnet 44c is located at the backward side with respect to stator teeth 23a in the direction of rotation P, magnetic lines of force mt11 and mt12 run in an inclining manner towards the backward side in the direction of rotation P, as a function of running inwardly in the radial direction. Therefore, magnet 44c is pulled towards the forward side in the direction of rotation P. Thus, rotor 40 rotates towards the forward side in the direction of rotation P.

Magnetic lines of force mt13 and mt23 among magnetic lines of force mt11-mt13 and mt21-mt23 run along the radial direction of stator core 22. Magnetic lines of force mt13 and mt23 enter field yoke 21 and run therethrough into rotor core 43.

Specifically, magnetic lines of force mt13 and mt23 run through magnetic circuit K5 from the surface of magnet 44a to arrive at the end face of stator teeth 23b, pass through stator core 22 in the radial direction, arriving at sidewall 21b of field yoke 21 to proceed in the axial direction, entering compacted rotor core 43b from projection 21c to return to magnet 44a.

The number of times magnetic circuits K3 and K4 cross rotor 40 and stator 30 is higher than the number of times of magnetic circuit K5 crosses rotor 40 and stator 30. Therefore, the torque generated by the magnetic lines of force passing through magnetic circuits K3 and K4 is larger than the torque generated by magnetic lines of force mt13 and mt23 passing through magnetic circuit K5.

Since magnetic flux based on the combination of the magnetic flux from magnet 44a, the magnetic flux from magnet 44b, and the magnetic flux from magnet 44c flows from the outer surface of magnet 44a, the torque obtained can be increased than in the case where magnet 44 is formed of magnet 44a alone.

Since magnets 44b and 44c intensively attract the magnetic lines of force running towards rotor 40 from stator 30, the variation of the path of the magnetic lines of force from stator 30 to rotor 40 caused by the magnetic flux of coil 24 shown in FIG. 10 can be suppressed.

Figure 12:
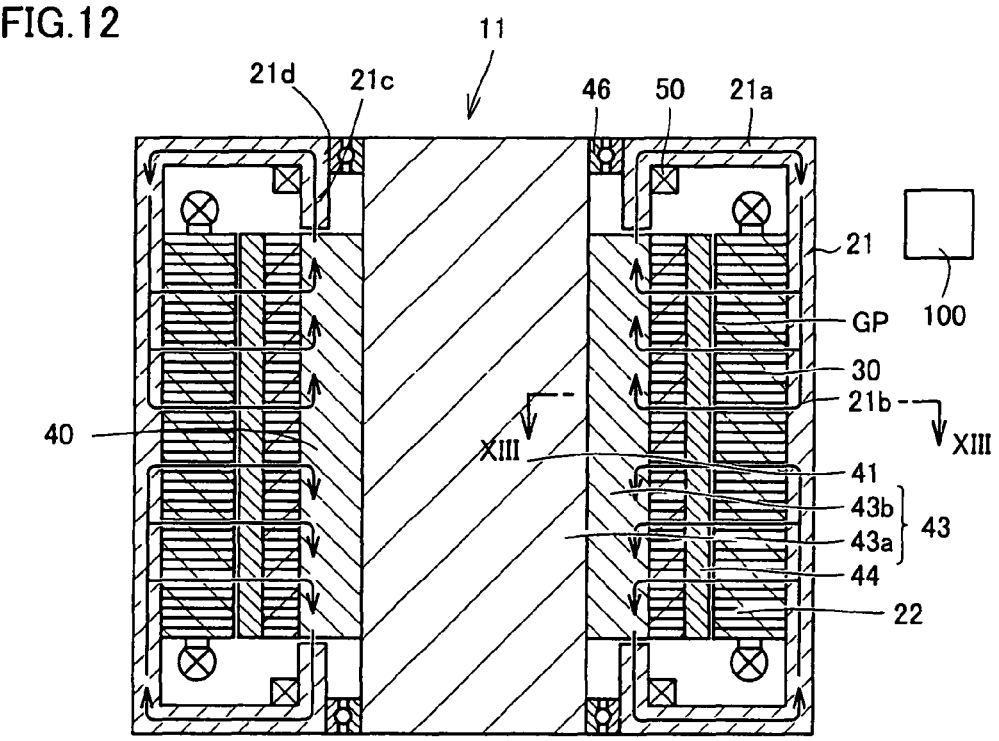
FIG. 12 is a side sectional view of a rotating electric motor when field strengthening control is effected.
Figure 13:
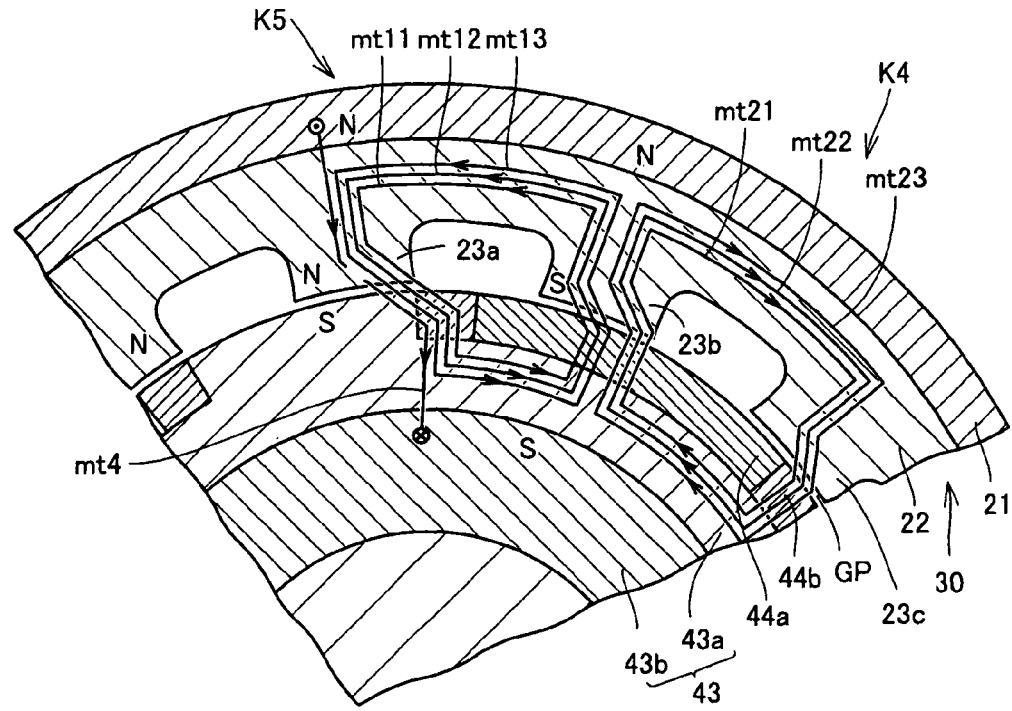
FIG. 13 is a sectional view taken along line XIII-XIII of FIG. 12.

FIG. 12 is a side sectional view of rotating electric motor 11 when field strengthening control is effected. FIG. 13 is a sectional view taken along line XIII-XIII of FIG. 12. As shown in FIGS. 12 and 13, rotating electric motor 11 according to the second embodiment conducts current to field coil 50 to achieve the flow of magnetic line of force mt4, likewise rotating electric motor 10 of the first embodiment.

Accordingly, sidewall 21b of field yoke 21 functions as the N pole. Referring to FIG. 13, magnetic lines of force mt11-mt13 and mt21-mt23 entering stator core 22 from the end face of stator teeth 23b can be prevented from reaching field yoke 21. In other words, the generated torque can be improved by reducing the ratio of magnetic lines of force mt11-mt13 and mt21-mt23 from magnet 44a passing through magnetic circuit K5 and increasing the ratio of magnetic lines of force passing through magnetic circuit K3 or magnetic circuit K4.

Figure 14:
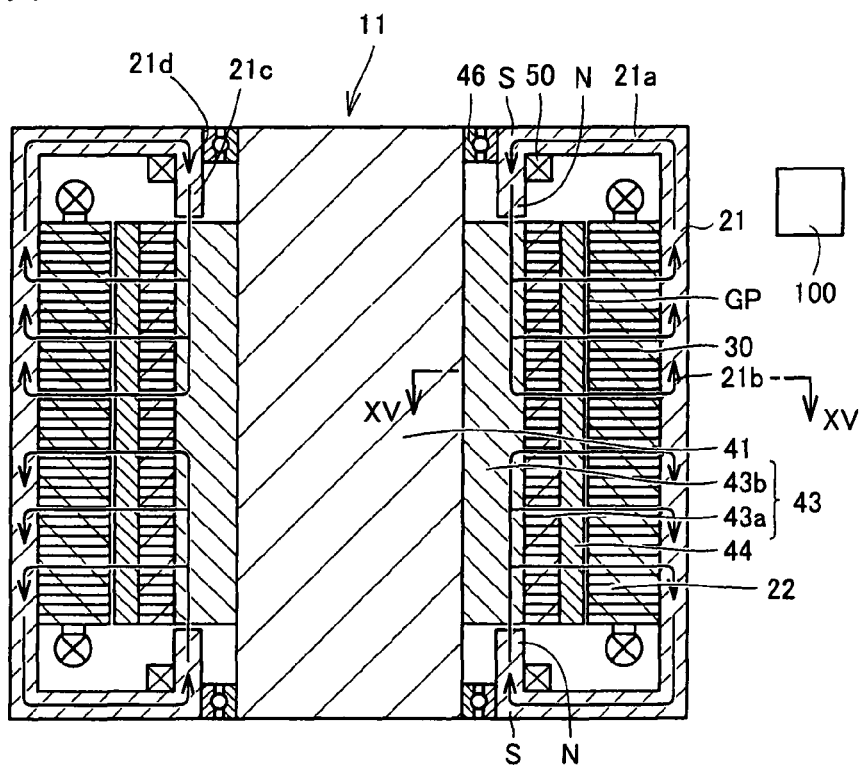
FIG. 14 is a side sectional view of a rotating electric motor when field weakening control is effected.
Figure 15:
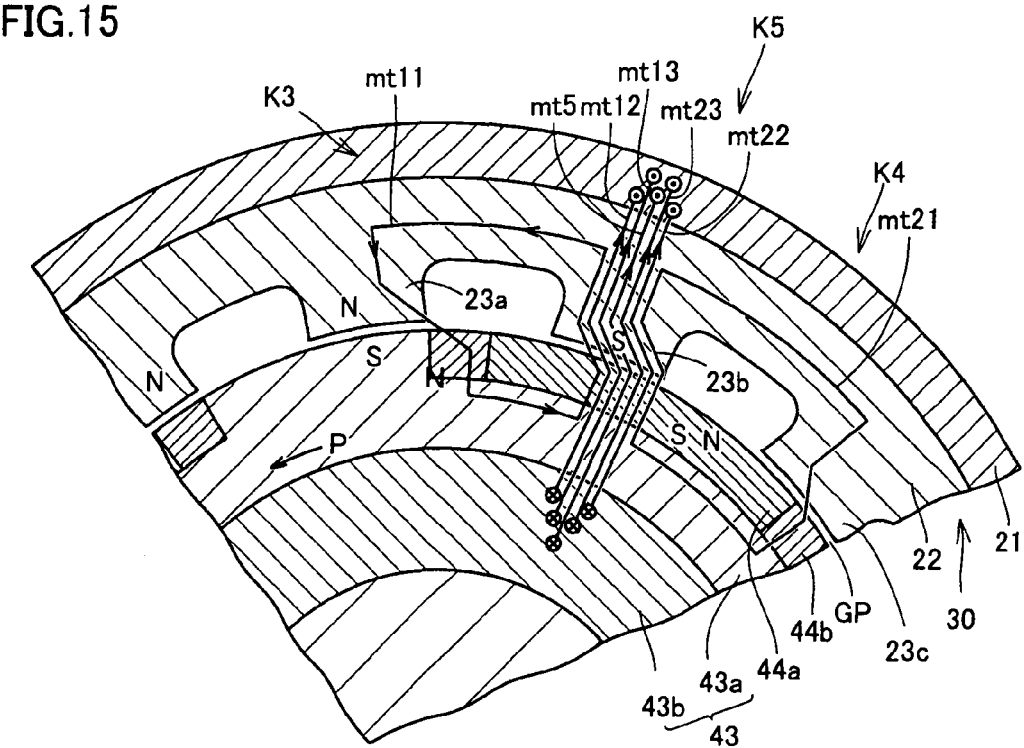
FIG. 15 is a sectional view taken along line XV-XV of FIG. 14.

FIG. 14 is a side sectional view of rotating electric motor 11 when field weakening control is effected. FIG. 15 is a sectional view taken along line XV-XV of FIG. 14.

As shown in FIG. 14, the field weakening control of rotating electric motor 11 of the second embodiment corresponds to conducting current to field coil 50 to generate magnetic line of force mt5, likewise the field weakening control of rotating electric motor 10 of the first embodiment.

Accordingly, sidewall 21b of field yoke 21 functions as the S pole. Therefore, magnetic lines of force mt11-mt13 and mt21-mt23 entering stator core 22 from stator teeth 23b are pulled to sidewall 21b of field yoke 21.

Among magnetic lines of force mt11-mt13 and mt21-mt23, magnetic lines of force mt12, mt13, mt22 and mt23 enter sidewall 21b to pass through magnetic circuit K5, whereas the remaining magnetic lines of force mt11 and mt21 pass through magnetic circuit K3 or K4.

Accordingly, the ratio of magnetic line of force mt11-mt13 and mt21-mt23 emitted from magnet 44a passing through magnetic circuit K3 or K4 is reduced whereas the ratio of the magnetic lines of force passing through magnetic circuit K5 is increased. Thus, the quantum of flux flowing across rotor 40 and stator 30 can be reduced. Therefore, the function and advantage similar to those of rotating electric motor 10 of the first embodiment can be obtained.

Magnet 44 of rotating electric motor 11 of the second embodiment can provide higher torque since the quantum of generated flux is greater than that of magnet 44 of rotating electric motor 11 of the first embodiment.

Third Embodiment

Figure 16:
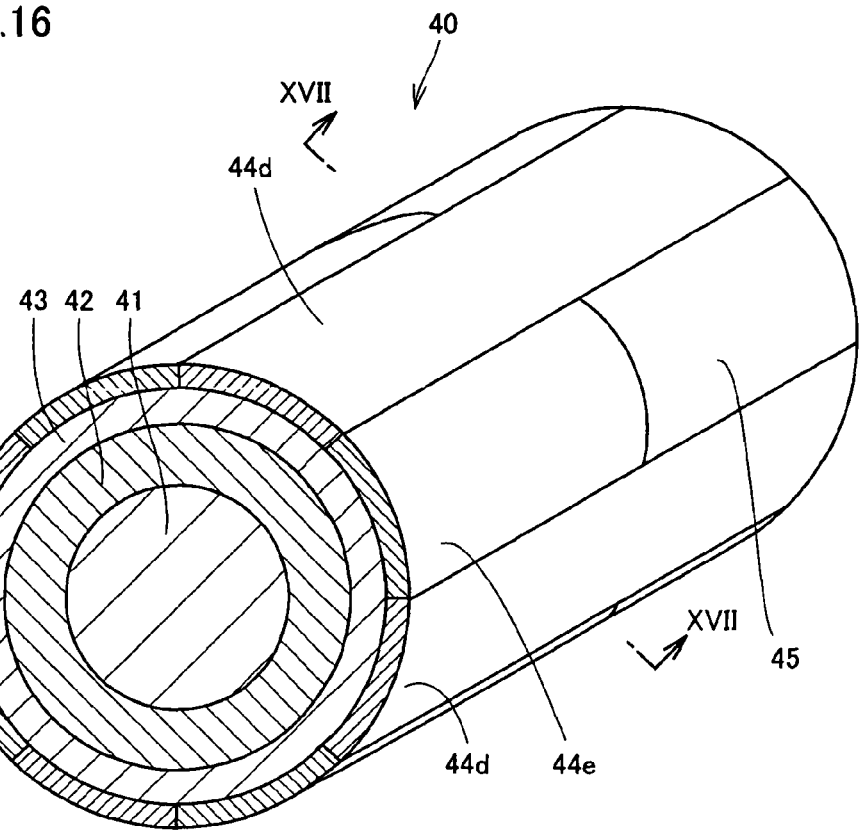
FIG. 16 is a perspective view of a rotor of a rotating electric motor according to a third embodiment.

A rotating electric motor according to a third embodiment of the present invention will be described with reference to FIG. 16. FIG. 16 is a perspective view of rotor 40 of a rotating electric motor according to the third embodiment.

As shown in FIG. 16, a magnet 44d and a magnet 44e are provided at the outer surface of rotor 40.

The outer side surface of magnet 44d corresponds to the N pole. The surface opposite to this surface is taken as the S pole. In other words, the N pole and the S pole of magnet 44d are aligned in the radial direction. Magnet 44d extends from one end to the other end of rotor 40.

Magnet 44e has a length shorter than that of magnet 44d in the axial direction. Magnet 44e extends from one end of rotor 40 to the central portion of rotor 40 in the axial direction. Magnet 44e is provided to cover the outer surface of rotor 40 at the region located between magnets 44d.

The outer side surface of magnet 44e corresponds to the S pole. A magnetic pole of the magnetism differing from that of magnet 44d is located at the outer side.

Thus, a magnetic circuit is formed that runs through magnet 44e, magnet 44d formed adjacent to magnet 44e, and the stator. The magnetic flux passing through this magnetic circuit includes the magnetic flux from magnet 44e and from magnet 44d, resulting in a flow of a large quantum of flux. Therefore, torque of a great amount can be obtained.

Rotor teeth 45 is provided at the outer surface of rotor 40 located between magnet 44d, adjacent to magnet 44e in the axial direction.

Figure 17:
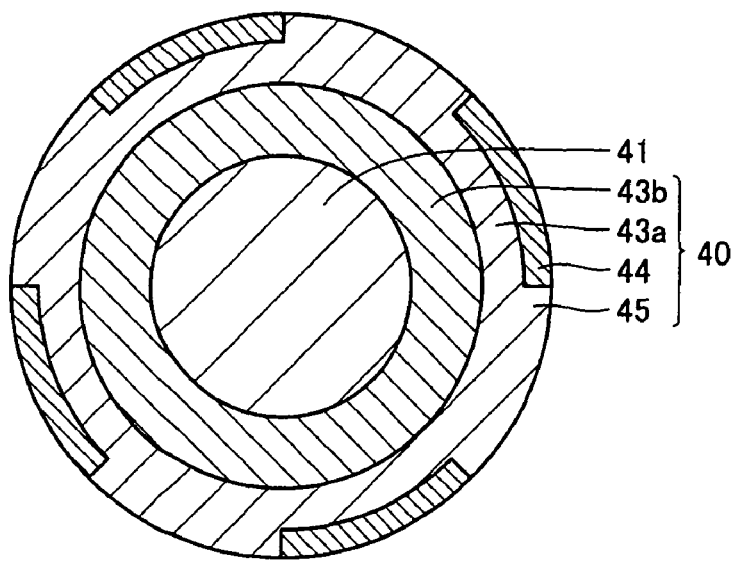
FIG. 17 is a sectional view taken along line XVII-XVII of FIG. 16.

FIG. 17 is a sectional view taken along line XVII-XVII of FIG. 16. As shown in FIG. 17, the portion corresponding to rotor teeth 45 takes a configuration similar to that of rotating electric motor 10 of the first embodiment.

Therefore, the function and advantage similar to those of rotating electric motor 10 of the first embodiment can be achieved at the region where rotor teeth 45 is formed.

Figure 18:
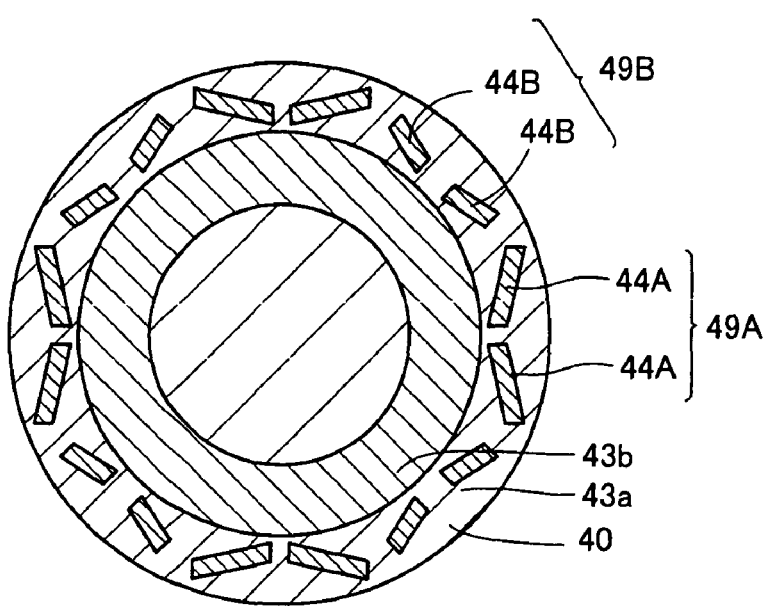
FIG. 18 is a sectional view representing an embodiment in which the present invention is applied to an SPM motor.

Although magnet 44 is formed at the outer surface of rotor 40 in the first to third embodiments, the present invention is not limited thereto. Magnet 44 can be embedded in rotor 40, as shown in FIG. 18. In other words, the present invention is applicable, not only to the SPM (Surface Permanent Magnet), but also the IPM (Interior Permanent Magnet). In rotor 40 shown in FIG. 18, there are provided a magnet pair 49A formed of two magnets 44A and 44A, and a magnet pair 49B formed of two magnets 44B and 44B, spaced apart from magnet pair 49A in the circumferential direction. Magnets 44A and 44B are inserted into holes formed in rotor 40.

Rotor 40 of FIG. 18 has magnets 44A and 44B aligned such that the magnetic poles of Magnets 44A and 44B align in the radial direction of rotor 40. Therefore, the function and advantage similar to those of rotating electric motor 10 of the first embodiment can be obtained. According to rotor 40 configured as set forth above, both the magnet torque (attraction/repulsion of the permanent magnet and coil) and the reluctance torque (the force to render the bending of the linear magnetic line of force=the force of coil to attract iron) can be improved.

Fourth Embodiment

A rotating electric motor 14 according to a fourth embodiment of the present invention will be described hereinafter with reference to FIGS. 19 and 20. Elements similar to those already shown in FIGS. 1-18 have the same reference character allotted, and description thereof will not be repeated.

Figure 19:
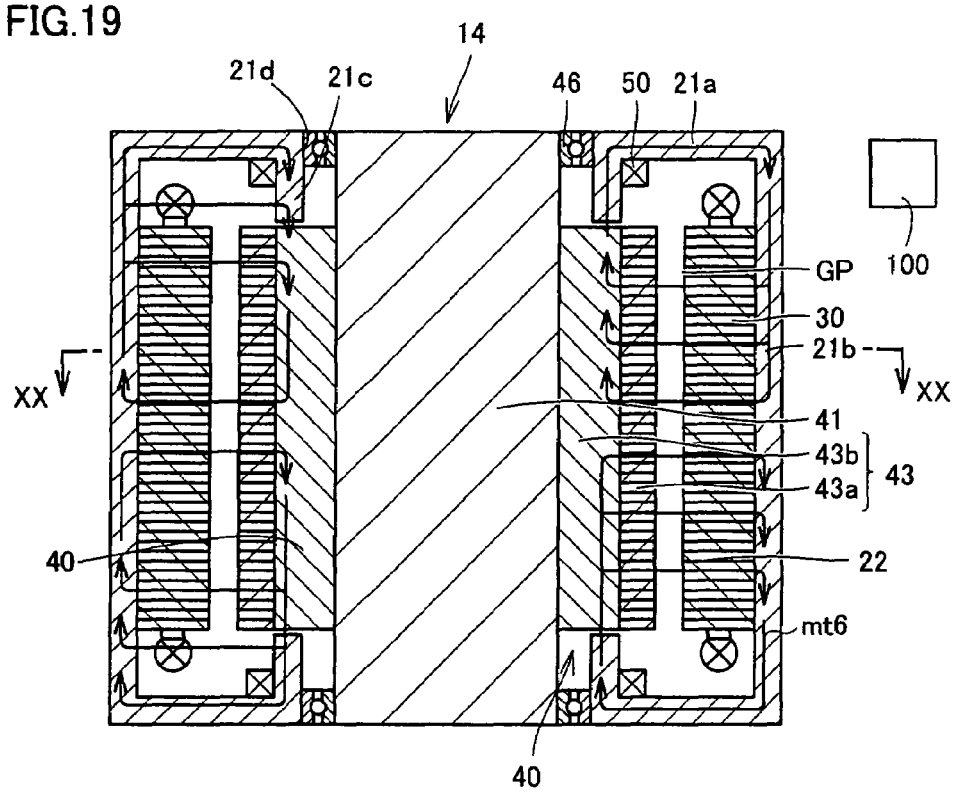
FIG. 19 is a side sectional view of a rotating electric motor according to a fourth embodiment.

FIG. 19 is a side sectional view of rotating electric motor 14 according to the fourth embodiment. FIG. 20 is a sectional view taken along line XX-XX of FIG. 19.

Referring to FIG. 19, rotating electric motor 14 according to the fourth embodiment includes a rotary shaft 41, a rotor 40 fixed to rotary shaft 41, a field yoke 21 provided at the outer perimeter of stator 30, and a field coil 50.

Figure 20:
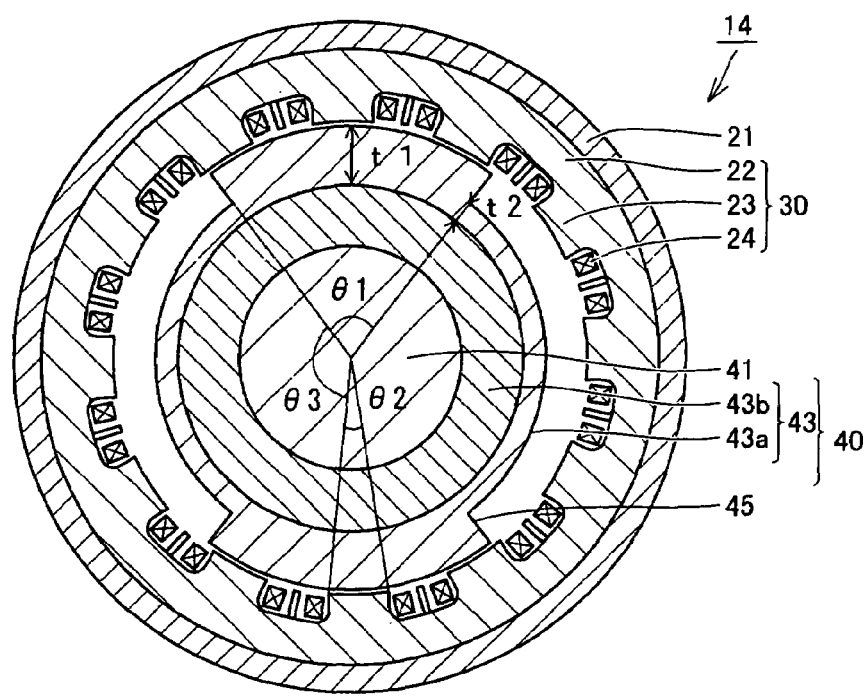
FIG. 20 is a sectional view taken along line XX-XX of FIG. 19.

As shown in FIG. 20, rotor 40 includes two rotor teeth 45, arranged to face each other.

The thickness t1 in the radial direction of compacted rotor core 43b where rotor teeth 45 is located is preferably set to at least two times the thickness t2 in the radial direction of compacted rotor core 43b located between rotor teeth 45.

By the projection of rotor teeth 45 in the radial direction, leakage of the magnetic flux from stator core 22 to the portion of rotor core 43 located between rotor teeth 45 can be suppressed. Accordingly, the flux linkage quantum of the armature winding is increased. Therefore, the torque can be increased.

Figure 21:
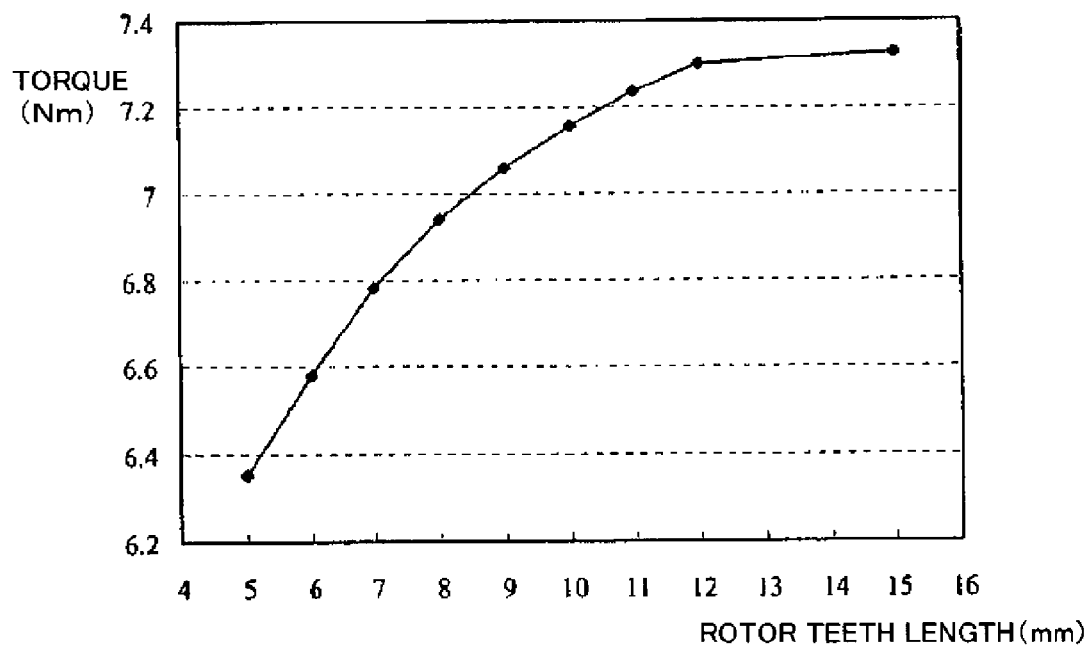
FIG. 21 is a graph representing the relationship between a rotor teeth length t (=t1−t2) and torque T.

FIG. 21 is a graph representing the relationship between the rotor teeth length t (=t1−t2) and torque T. Specifically the graph of FIG. 21 represents the relationship of t−T where rotating electric motor 14 has the dimensions and the like set forth in the following Table 1 with the field current set at 2000 AT and armature current set at 168 Arms.

TABLE 1

| | |
|---|---|
| Air gap GP | 0.7 mm |
| Stator outer diameter | 164 mm |
| Shaft outer diameter | 54.8 mm |
| Motor entire length in axial direction | 145 mm |
| Number of slots (number of stator teeth) | 12 |
| Number of poles | 4 |
| Field yoke inner diameter | 150.6 mm |
| Stator core inner diameter | 116.2 mm |
| Width of field yoke in radial direction | 6.7 mm |
| Stator teeth angle θ2 | 15 dge |
| Stator core yoke width | 10.2 mm |
| Slot groove depth (stator teeth length) | 7.0 mm |
| Rotor outer diameter | 114.8 mm |
| Compacted rotor core outer diameter | 84.8 mm |
| Compacted rotor core width in radial direction | 15 mm |
| Rotor teeth angle θ1 | 90 dge |
| Rotor core yoke width | 10 mm |
| Rotor teeth length | 5 mm |
| Main motor stacked layer thickness | 59 mm |
| One side field magnetic pole axial direction length | 43 mm |
| Field gap | 0.3 mm |
| Coil end length | 20 mm |

TABLE 1-continued

| | | | |
|---|---|---|---|
| Number of armature windings | | 3 | Turn |
| Occupying rate of armature winding | | 0.5 | |
| Occupying rate of field coil | | 0.5 | |
| Constraint | | | |
| Maximum current density | At continuous rating | 6.16 | Arms/mm² |
| | At peak | 9.0 | Arms/mm² |
| Maximum voltage (at peak) | At steady rotation | 117 | Vrms |
| | At highest rotation | 117 | Vrms |
| Rated current (at continuous rating) | At continuous rating | 115 | Arms |
| | At peak | 168 | Arms |
| Required specification | | | |
| Continuous rating power | | 15 | kW |
| Peak power | | 22 | kW |
| Steady rotation speed | | 35000 | rpm |
| Highest rotation speed | | 35000 | rpm |
| Rated torque | At continuous rating | 4.1 | Nm |
| | At peak | 6.0 | Nm |

It is appreciated from FIG. 21 that torque T is increased by increasing rotor teeth length t. Therefore, rotor teeth length t can be set within a range that is acceptable from the standpoint of mechanical strength. For example, in the case of t1=15 mm, rotor teeth length t is set to the range of at least 5 mm and not more than 10 mm.

As shown in FIG. 20, rotor teeth angle θ1 is set such that the end of rotor teeth 45 is consistent with the end of one stator teeth 23 in the radial direction when the center of rotor teeth 45 in the circumferential direction and the center of another stator teeth 23 in the circumferential direction is aligned in the radial direction. For example, when stator teeth angle θ2 is 15°, rotor teeth angle θ1 is set to approximately 75°.

In other words, the total of rotor teeth angle θ1 (θ1×(number of rotor teeth)) is smaller than the total of angle θ3 between rotor teeth 45 (θ3×(number of rotor teeth)).

Since the area of torque generation is increased as rotor teeth angle θ1 becomes larger, the torque becomes greater. However, when rotor teeth angle θ1 becomes larger than 75°, a non-facing stator teeth 23 will be located in the proximity of the end of rotor teeth 45 in the circumferential direction. Magnetic flux will leak to this stator teeth 23, causing torque reduction.

Figure 22:
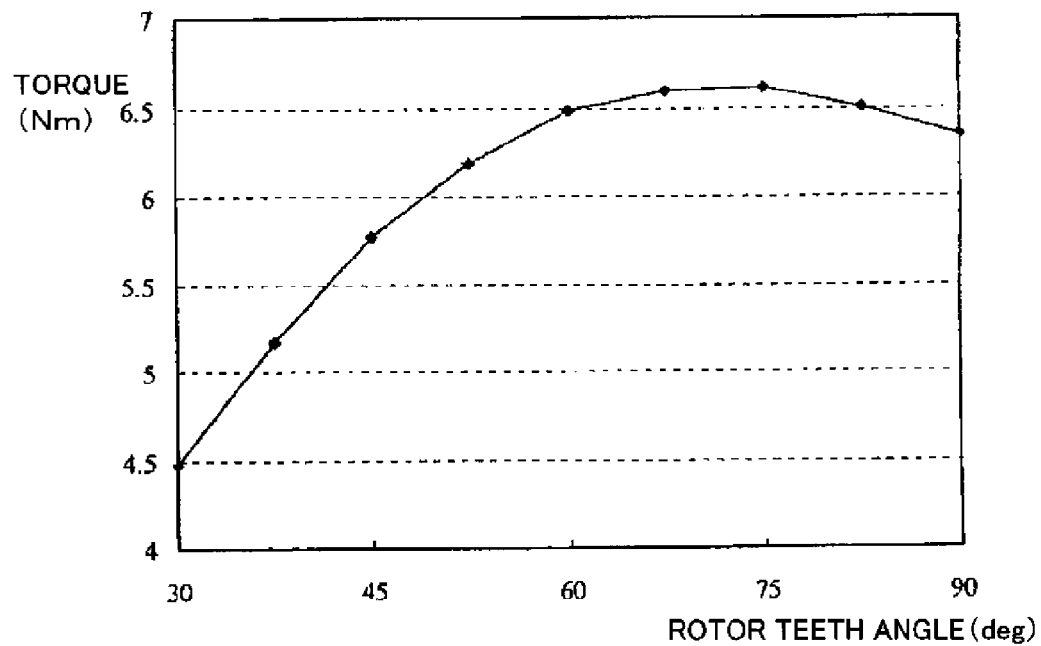
FIG. 22 is a graph representing the relationship between a rotor teeth angle θ1 and torque T.

FIG. 22 is a graph representing the relationship of rotor teeth angle θ1 and torque T. Specifically, the graph of FIG. 22 represents the relationship of θ1−T t−T where rotating electric motor 14 has the dimensions and the like set forth in Table 1 with the field current set at 2000 AT and armature current set at 168 Arms.

It is appreciated from FIG. 22 that the torque is reduced when rotor teeth angle θ1 is at least 75°. The outer diameter of rotor 40 is set depending upon the level of magnetic saturation in stator core 23 and the torque generation area.

Figure 23:
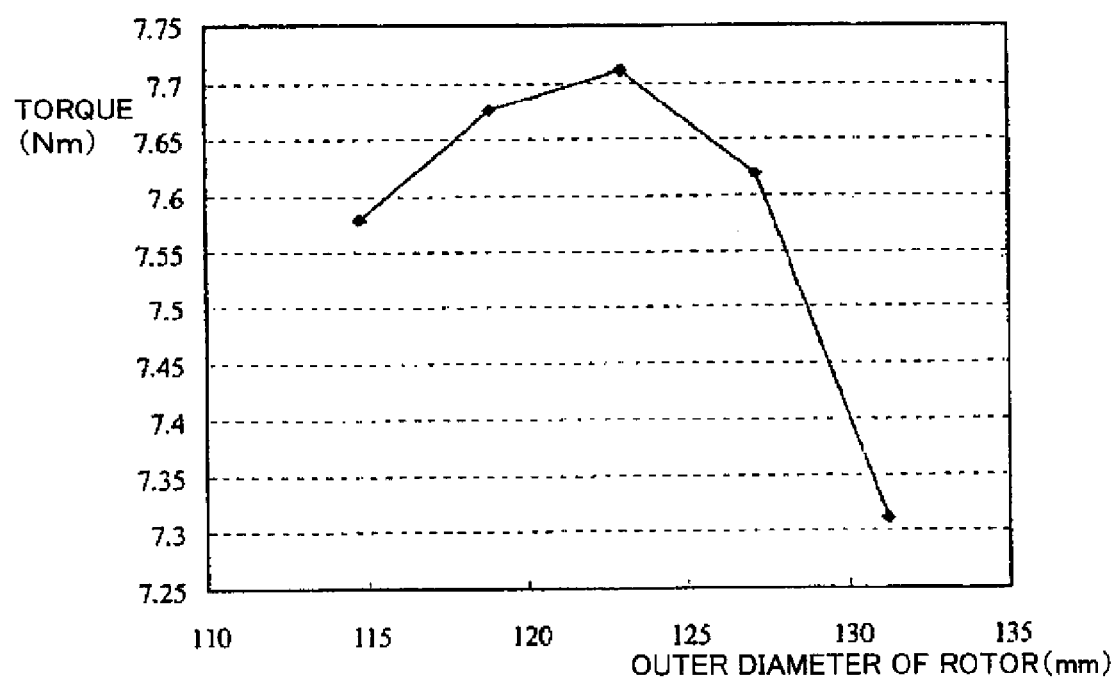
FIG. 23 is a graph representing the relationship between the outer diameter of the rotor and torque N.

FIG. 23 is a graph representing the relationship between the outer diameter of rotor 40 and torque N. It is appreciated from FIG. 23 that the torque increases in proportion to the gradual increase of the outer diameter of rotor 40. However, the torque is reduced when the outer diameter of rotor 40 exceeds a predetermined value.

This is because, when the outer diameter of rotor 40 is at least a predetermined value, magnetic saturation in stator core 22 occurs to cause decrease of the flux linkage of the armature winding. When the outer diameter of rotor 40 is smaller than the predetermined value, the torque generation area becomes larger to increase the torque. In the example shown in FIG. 23, it is appreciated that the outer diameter of rotor 40 is preferably 123 mm.

In FIG. 20, the stator teeth angle θ2 of stator teeth 23 is set depending upon the relationship between the torque generation area and the magnetic saturation in stator core 22 and field yoke 21.

Figure 24:
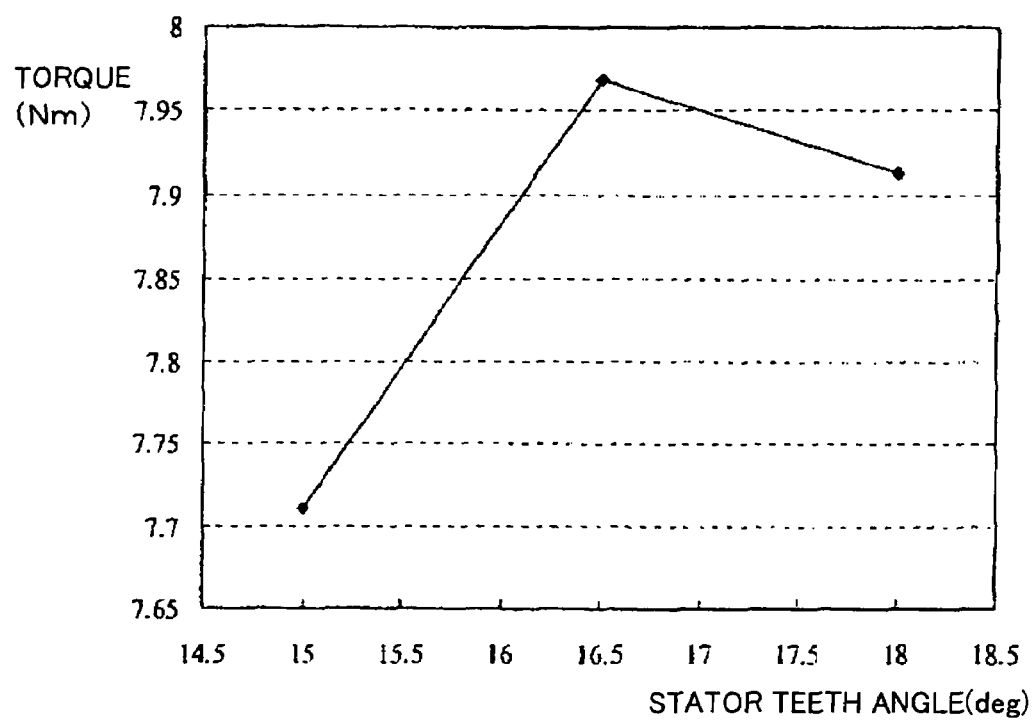
FIG. 24 is a graph representing the relationship between a stator teeth angle θ2 and torque.

FIG. 24 is a graph representing the relationship between stator teeth opening θ2 and the torque. The field current is set to 2000 AT; the armature current is set to 168 Arms; and the outer diameter of rotor 40 is set to 123 mm. The cross sectional area of stator teeth 23 is maintained such that the current density of stator teeth 23 does not exceed the maximum current density of 9.0 Arms/mm$^2$. It is appreciated from FIG. 24 that the torque is reduced when stator teeth angle θ2 is at least 16.5°.

This is because, when stator teeth angle θ2 is not more than 16.5°, the torque generation area becomes larger as stator teeth opening θ2 is increased, causing a larger flux linkage of the armature winding. Further, when stator teeth opening θ2 is at least 16.5°, torque reduction occurs due to magnetic saturation in field yoke 41.

Although the degree of torque reduction caused by the magnetic saturation in field yoke 21 is smaller than that caused by magnetic saturation in stator core 22, magnetic saturation will occur even in stator core 22 if stator teeth angle θ2 is further increased, resulting in significant reduction in torque. In the example shown in FIG. 24, stator teeth angle θ2 is preferably set to 16.5°.

The operation of rotating electric motor 14 configured as set forth above will be described hereinafter. Referring to FIG. 19, current is conducted to the field coil, whereby magnetic line of force mt6 is generated, from projection 21c of field yoke 21 to enter compacted rotor core 43b, to enter the stator core from rotor teeth 45 of layered rotor core 3a, and then reach field yoke 21 to return to projection 21c.

In FIG. 20, the surface of rotor teeth 45 holds the polarity of the N pole since magnetic line of force mt6 reaches stator core 22 from rotor teeth 45. Therefore, rotating electric motor 14 of the fourth embodiment operates in a manner similar to that of a general permanent magnet synchronous motor.

By adjusting the amount of current supplied to field coil 50, the quantum of flux generated can be adjusted. Accordingly, the so-called "field weakening control" and "field strengthening control" can be conducted.

For example, by increasing the amount of current supplied to field coil 50, the flux quantum of magnetic line of force mt6 can be increased, allowing greater torque to be obtained.

Further, by reducing the amount of current supplied to field coil 50, the magnetic flux generated across stator 30 and rotor 40 is reduced, so that the inductive electromotive force generated at coil 24 can be reduced in a high revolution region. Such reduction of inductive electromotive force allows increase of the revolution speed consistent with the maximum voltage of the power source such as the inverter. Therefore, rotating electric motor 10 can be driven even at a high revolution region.

Each of the numeric set forth above is only a way of example, and is not limited to the specified numerics and range set forth above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rotating electric motor comprising:
   a rotary shaft capable of rotation,
   a stator core formed in a cylindrical configuration,
   a rotor core fixed to said rotary shaft,
   a magnet set at said rotor core such that a pair of magnetic poles differing in magnetism are aligned in a radial direction of said rotor core,
   a field yoke provided at a perimeter of said stator core, and
   a winding that can control a magnetic flux density across said rotor core and said stator core by forming a magnetic circuit across said field yoke and said rotor core;
   wherein said rotor core includes a first rotor core of a cylindrical configuration, and a second rotor core provided in an inner circumference of said first rotor core, having a magnetic reluctance in an axial direction smaller than the magnetic reluctance of said first rotor core in the axial direction:
   wherein said first rotor core has a magnetic reluctance smaller in a circumferential direction and radial direction than in the axial direction,
   said stator core has a magnetic reluctance smaller in the circumferential direction and radial direction than in the axial direction.

2. The rotating electric motor according to claim 1, further comprising a salient pole formed at an outer surface of said rotor core, protruding outwardly in the radial direction,
   wherein said magnet is provided at an outer surface of said rotor core adjacent to said salient pole.

3. The rotating electric motor according to claim 1, wherein said magnet extends across one end to an other end of said rotor core.

4. The rotating electric motor according to claim 1, wherein said field yoke is formed of a magnetic material integrally compacted.

5. The rotating electric motor according to claim 1, wherein said first rotor is formed of a plurality of layered steel plates, and said second rotor core is formed of a magnetic material integrally compacted.

6. A rotating electric motor comprising:
   a rotary shaft capable of rotation,
   a stator core formed in a cylindrical configuration,
   a rotor core fixed to said rotary shaft,
   a salient pole formed at an outer surface of said rotor core, protruding outwardly in the radial direction, extending from one end to an other end of said rotor core,
   a field yoke provided at a perimeter of said stator core, and
   a winding that can control a magnetic flux density across said rotor core and said stator core by forming a magnetic circuit across said field yoke and said rotor core;
   wherein said rotor core includes a first rotor core of a cylindrical configuration, and a second rotor core provided in an inner circumference of said first rotor core, having a magnetic reluctance in an axial direction smaller than the magnetic reluctance of said first rotor core in the axial direction;
   wherein said first rotor core has a magnetic reluctance smaller in a circumferential direction and radial direction than in the axial direction,
   said stator core has a magnetic reluctance smaller in the circumferential direction and radial direction than in the axial direction.

7. The rotating electric motor according to claim 6, wherein said field yoke is formed of a magnetic material integrally compacted.

8. The rotating electric motor according to claim 6, wherein said first rotor core is formed of a plurality of layered steel plates, and said second rotor core is formed of a magnetic material integrally compacted.

9. The rotating electric motor according to claim 1, wherein the a field yoke includes tops respectively spaced apart from each axial end of the rotor core and stator core and a sidewall of a cylindrical configuration formed at the perimeter of the tops.

10. The rotating electric motor according to claim 9, wherein the field yoke further comprises a cylindrical projection formed at each of the tops.

11. The rotating electric motor according to claim 9, wherein the cylindrical projections respectively protrude toward the axial ends of the rotor core.

12. The rotating electric motor according to claim 6, wherein the a field yoke includes tops respectively spaced apart from each axial end of the rotor core and stator core and a sidewall of a cylindrical configuration formed at the perimeter of the tops.

13. The rotating electric motor according to claim 12, wherein the field yoke further comprises a cylindrical projection formed at each of the tops.

14. The rotating electric motor according to claim 13, wherein the cylindrical projections respectively protrude toward the axial ends of the rotor core.

15. The rotating electric motor according to claim 1, wherein said magnet includes a first magnet, and a second magnet provided at a position adjacent to said first magnet, said first magnet at a portion located at the outer surface side of said rotor core has a magnetic pole different from the magnetic pole of said second magnet at a portion located at the outer surface side of said rotor core.

16. The rotating electric motor according to claim 15, wherein said first magnet is formed longer than said second magnet in the axial direction of said rotor core, further comprising a salient pole formed between said first magnet and at a surface of said rotor core adjacent to said second magnet in the axial direction of said rotor core, protruding outwardly in the radial direction of said rotor core.

17. The rotating electric motor according to claim 1, wherein said magnet is embedded in said rotor core.

* * * * *